United States Patent

Horita

Patent Number: 5,508,857
Date of Patent: Apr. 16, 1996

[54] MAGNETIC HEAD LOADING/UNLOADING APPARATUS MAINTAINING A MAGNETIC HEAD AT PREDETERMINED POSITIONS BY PERMANENT MAGNETS

[75] Inventor: Masami Horita, Hoya, Japan

[73] Assignee: TEAC Corporation, Japan

[21] Appl. No.: 336,544

[22] Filed: Nov. 9, 1994

[30] Foreign Application Priority Data

Nov. 10, 1993 [JP] Japan .................................. 5-281461

[51] Int. Cl.$^6$ ............................................. G11B 21/12
[52] U.S. Cl. ............................. 360/75; 360/105; 369/257
[58] Field of Search ......................... 360/75, 105, 104; 369/257, 251, 244

[56] References Cited

U.S. PATENT DOCUMENTS

| | | | |
|---|---|---|---|
| 4,170,362 | 10/1979 | Zwicky et al. | 369/255 X |
| 5,122,998 | 6/1992 | Mizuno et al. | 360/103 |
| 5,313,445 | 5/1994 | Woda et al. | 360/75 X |

FOREIGN PATENT DOCUMENTS

| | | | |
|---|---|---|---|
| 0530040 | 3/1993 | European Pat. Off. | 360/105 |
| 3-19160 | 1/1991 | Japan . | |
| 3-19159 | 1/1991 | Japan . | |
| 3-104069 | 5/1991 | Japan . | |
| 3-104068 | 5/1991 | Japan . | |
| 3-288347 | 12/1991 | Japan . | |
| 5-28674 | 2/1993 | Japan | 360/75 |

*Primary Examiner*—Aristotelis Psitos
*Assistant Examiner*—James T. Wilson
*Attorney, Agent, or Firm*—Andrus, Sceales, Starke & Sawall

[57] ABSTRACT

A magnetic head loading/unloading apparatus has a head arm being maintained in either a loading state or an unloaded state by means of a permanent magnet. The head arm has a magnetic head on one end thereof, and is fixed on an end of a first yoke. A second yoke is arranged parallel to the first yoke, and is rotatable on the first yoke. A touching member is fixed on the second yoke, the touching member pressing a bottom surface of the head arm so as to elastically deform the head arm so that the magnetic head is positioned in an unload position. A permanent magnet is provided on the first yoke and a coil is provided on the second yoke. When the second yoke is moved to a first position, the head arm is elastically bent by a pressing force exerted by the contacting member so that the magnetic head is positioned in an unload position. When the second yoke is moved to a second position, the contacting member is apart from the head arm so that the magnetic head is in a load position. The second yoke is maintained in either the first position or the second position by the attracting force generated by the permanent magnet.

8 Claims, 7 Drawing Sheets

MAGNETIC HEAD LOADING/UNLOADING APPARATUS MAINTAINING A MAGNETIC HEAD AT PREDETERMINED POSITIONS BY PERMANENT MAGNETS

BACKGROUND OF THE INVENTION

The present invention relates to a magnetic head loading/unloading apparatus used in a disk apparatus, and more particularly to a magnetic head loading/unloading apparatus having a head arm on one end of which is mounted a magnetic head, the head arm being driven by a magnetic force generated by a coil.

Generally, a magneto-optical disk apparatus uses an optical-modulation recording method. In this method, when previously recorded information on a magneto-optical disk is rewritten, an erasing operation in which directions of magnetization formed on the magneto-optical disk are uniformly changed to an erasing direction is performed first, and then a direction of magnetization of a magnetic head is switched to a recording direction. Thereafter, a laser beam is projected on the magneto-optical disk to perform a recording operation of data. Accordingly, in the above-mentioned recording method, time is spent on performing the erasing operation, and thus there is a problem in that time spent on the recording operation is increased.

On the other hand, there is a magnetic-modulation recording method in which an over-writing is enabled. The magnetic-modulation recording method not only improves a recording-data transfer rate but also is effective in a mark-edge recording method which is used for increasing recording density.

A description will now be given, with reference to FIGS.1 through 4, of a magneto-optical disk apparatus using a magnetic-modulation recording method.

As shown in FIGS.1 through 4, a magneto-optical disk 1 has a spirally formed tacking guiding groove, a recording surface of the disk being a bottom surface. A magnetic head 2 for generating a magnetic field sufficient for recording and erasing information on the magneto-optical disk 1 is mounted on an end of a head arm 3 formed of a leaf spring. A carriage 4 is slidable in a tracking direction underneath the magneto-optical disk 1 so that a top surface of the carriage 4 faces the bottom surface of the magneto-optical disk 1.

A fixed optical unit 5 has a laser diode, a light receiving element and other optical parts not shown in the figures. The magneto-optical disk 1 is loaded on a main body 7 in a state where the magneto-optical disk 1 is accommodated in a cartridge 6. A recording of information on the magneto-optical disk 1 and/or a reproducing of information from the magneto-optical disk 1 is performed by means of a laser beam projected through an objective lens 8 and by means of a magnetic field generated by the magnetic head 2.

That is, a laser beam 9 emitted by the fixed optical unit 5 passes through the objective lens 8, as shown in FIG.4, after its direction is bent 90 degrees by a reflection mirror 16 provided on the carriage 4. Thereafter, the laser beam 9 is converged on a recording film 19 of the magneto-optical disk 1.

The objective lens 8 is moved by an actuator 15 in a direction X parallel to and a direction Y perpendicular to the recording surface of the magneto-optical disk 1. The objective lens 8 is moved so that an appropriate laser-beam spot 17 is formed even if a fluctuation of a rotational plane and eccentricity of a rotation are generated in association with a rotation of the magneto-optical disk 1.

The head arm 3 is supported on the carriage 4 via a first connecting member 11 and a second connecting member 12. Accordingly, the magnetic head 2 provided above the magneto-optical disk 1 is always positioned opposite to the laser beam spot 17 relative to the magneto-optical disk 1.

The magnetic head 2 has such a shape that the magnetic head 2 receives a lifting force in the direction Y due to an air flow in a tangential direction generated by a high-speed rotation of the magneto-optical disk 1, and thus the magnetic head 2 is maintained in a state in which the magnetic head 2 floats on the magneto-optical disk 1.

The first connecting member 11 is rotatably connected to the second connecting member 12 via a pin 10. The first connecting member 11 is rotated by a driving mechanism (not shown in the figures) so that the magnetic head 2 on an end of the head arm 3 is moved to a load position in which the magnetic head 2 is very close to the magneto-optical disk 1 or to an unload position in which the magnetic head 2 is distant from the magneto-optical disk 1.

When the cartridge 6 accommodating the magneto-optical disk 1 is loaded in the main body 7, a shutter 6b provided on the cartridge 6 is opened, and the magneto-optical disk 1 is place on a turntable 14. At the time the cartridge 6 is loaded into the main body 7, the magnetic head 2 is lifted to the unload position as shown in FIG. 3 so as to prevent the head 2 from colliding with the cartridge 6.

After the magneto-optical disk 1 is placed on the turntable 14, the turntable 14 is rotated by a spindle motor 13, and thus the magneto-optical disk 1 is rotated at a predetermined speed. The laser beam 9 emitted by the fixed optical unit 5 is then projected on the magneto-optical disk 1.

Thereafter, as shown in FIG.2, the first connecting member 11 is rotated downwardly about the pin 10 on the second connecting member 12, and thus the magnetic head 2 is moved down to the load position close to the magneto-optical disk 1. In this state, since the magneto-optical disk 1 is rotated at the predetermined speed, an air flow is formed near the surface of the magneto-optical disk 1 due to viscosity of the air. Accordingly, the magnetic head 2 positioned close to the magneto-optical disk 1 receives a lifting force in the Y direction generated by the air flow, and thus the magnetic head 2 floats on the magneto-optical disk 1.

It should be noted that the head arm 3 has an elastic property, and as an elastic force of the head arm 3 balances the lifting force of the head 2, the magnetic head 2 floats a few micron millimeters above the magneto-optical disk 1. The magnetic head 2 then applies a modulated magnetic field on the magneto-optical disk 1, and the recording film 19 is partially heated above the curie point by converging the laser beam 9 which is not modulated on the recording film 19. The recording film 19 of which the temperature exceeds the curie point looses a magnetic coercive force, and thus is magnetized by the magnetic field applied by the magnetic head 2.

After a recording/reproducing operation is ended, the rotation of the turntable 14 by the spindle motor 13 is stopped. When the rotational speed of the magneto-optical disk 1 is reduced, the magnetic head 2 may collide with the magneto-optical disk 1 because the lifting force exerted on the magnetic head 2 is reduced.

In order to avoid this situation, the magnetic head 2 is lifted up to the unload position which is distant from the magneto-optical disk 1. This movement of the magnetic head 2 is performed by rotating the first connecting member 11 upwardly about the pin 10 on the second connecting member 12. Thereafter, the rotation of the spindle motor 13 is stopped, and then the cartridge 6 is ejected while the magnetic head 2 is lifted However, in the above-mentioned magneto-optical disk apparatus, in order to prevent the second connecting member 12 colliding with the cartridge 6 when the magnetic head 2 is moved to the innermost side of the magneto-optical disk, it is necessary to lengthen a distance between the magnetic head 2 and the second connecting member 12. Additionally, when the head arm 3 and the first connecting member 11 are rotated upwardly, in order to avoid a permanent deformation of the head arm 3, the length of the head arm 3 must be lengthened, and accordingly a large driving mechanism is needed for driving the first connecting member 11 due to the large weight of the head arm 3. Therefore, there is a problem in that an accessing speed of the magnetic head 2 mounted on an end of the head arm 3 is reduced. Additionally, the above-mentioned conventional apparatus has a complicated structure, and thus assembly takes time and labor, which condition results in an increase in manufacturing costs.

Other than the above-mentioned magneto-optical disk apparatus, an apparatus disclosed in Japanese Laid-Open Patent Application No. 3-104069 has been proposed in which apparatus a lamination type piezoelectric actuator is used. In this apparatus, the head arm is rotated by a displacement amplifying mechanism driven by the lamination type piezoelectric actuator.

However, in this construction, a current must be supplied continuously to the actuator while maintaining the magnetic head in the load position, and thus there is a problem that an internal temperature of the apparatus increases due to a large consumption of electric power. Another problem is that when a power source is unintentionally cut off due to, for example, a power failure, it is difficult to maintain the magnetic head in the unload position.

SUMMARY OF THE INVENTION

It is a general object of the present invention to provide a magnetic head loading/unloading apparatus in which the above-mentioned disadvantages are eliminated.

A more specific object of the present invention is to provide a magnetic head loading/unloading apparatus in which a head arm having a magnetic head is rotated by means of an electro magnetic force, the head arm being maintained in either a loading state or an unloaded state by means of a permanent magnet.

In order to achieve the above-mentioned objects, there is provided according the present invention, a magnetic head loading/unloading apparatus which moves a magnetic head between a load position and an unload position, a recording/reproducing operation being performed on a surface of a magnetic disk by the magnetic head in the load position, the unload position being apart from the load position in a direction perpendicular to the surface of the magnetic disk, the magnetic head loading/unloading apparatus comprising:

a head arm, made of an elastic material, having the magnetic head on one end thereof;

a first yoke made of a magnetic material, the head arm being fixed on an end of the first yoke;

a second yoke made of a magnetic material, the second yoke being arranged parallel to the first yoke;

a contacting member fixed on the second yoke, the contacting member pressing a bottom surface of the head arm so as to elastically deform the head arm so that the magnetic head is positioned in the unload position;

a supporting member rotatably supporting the second yoke on the first yoke, the second yoke being rotated between a first position and a second position, one end of the second yoke being in contact with the first yoke in the first position, the other end of the second yoke being in contact with the first yoke in the second position;

a permanent magnet provided on either one of the fist yoke and the second yoke so that a magnetic circuit is formed by the first yoke and the second yoke; and a coil provided on the other one of the first yoke and the second yoke, a current being supplied to the coil so that density of a magnetic flux generated by the permanent magnet is changed, wherein when the second yoke is moved to the first position, the head arm is elastically bent by a pressing force exerted by the contacting member so that the magnetic head is positioned in the unload position, and when the second yoke is moved to the second position, the contacting member is apart from the head arm so that the magnetic head is in the load position.

According to the present invention, since the head arm is maintained in a state where the magnetic head is either in the load position or the unload position by means of the permanent magnet, electric power consumed by the coil is reduced, and thus an increase in the temperature inside the apparatus is prevented. Additionally, the magnetic head loading/unloading apparatus according to the present invention is compact, and thus time and labor for performing an assembling process is reduced, resulting in high productivity.

Other objects, features and advantages of the present invention will become more apparent from the following detailed description when read in conjunction with the accompanying drawings.

DETAILED DESCRIPTION OF THE PREFERRED EMBODIMENT

Figure 1:
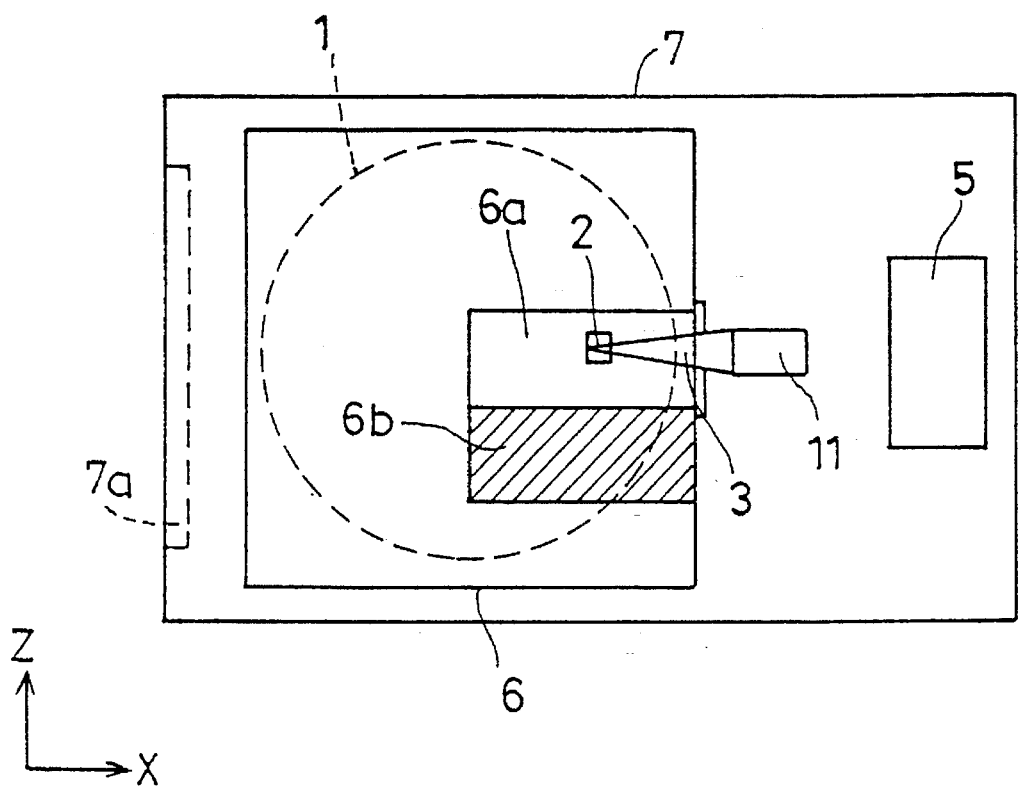
FIG. 1 is a plan view of a magneto-optical disk apparatus for explaining a conventional magnetic head loading/unloading apparatus.
Figure 2:
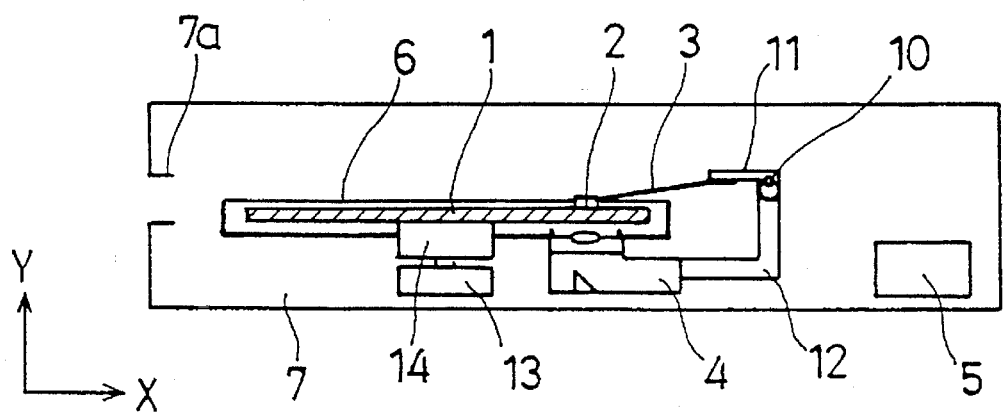
FIG. 2 is a side view of the magneto-optical disk apparatus shown in FIG.1 in a state where a magneto-optical disk is loaded.
Figure 3:
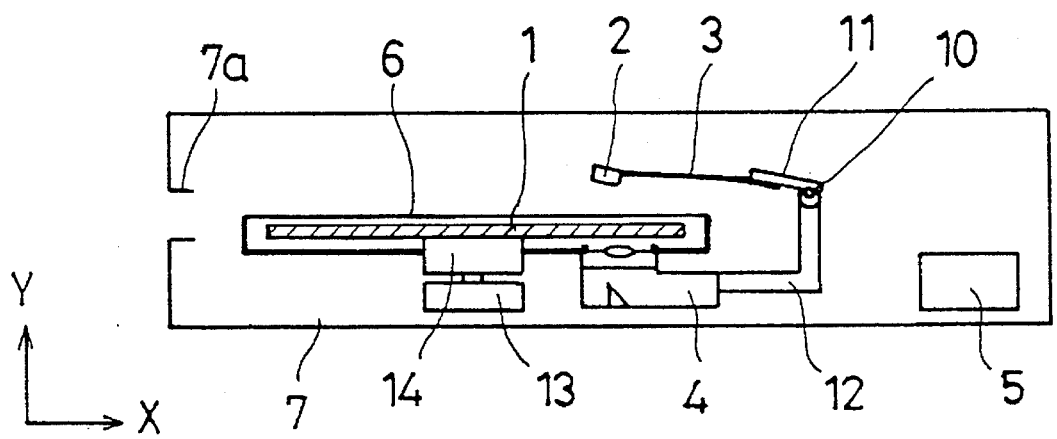
FIG. 3 is a side view of the magneto-optical disk apparatus shown in FIG.1 in a state where a magneto-optical disk is unloaded.
Figure 4:
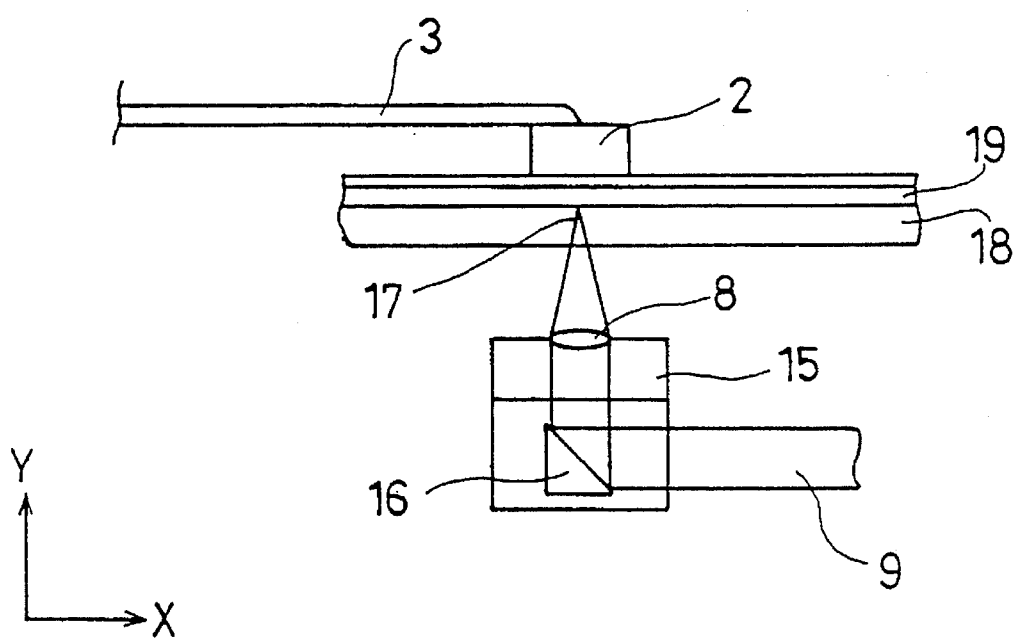
FIG. 4 is a illustration for explaining a beam path of a laser beam projected on a recording film of an magneto-optical disk.
Figure 5:
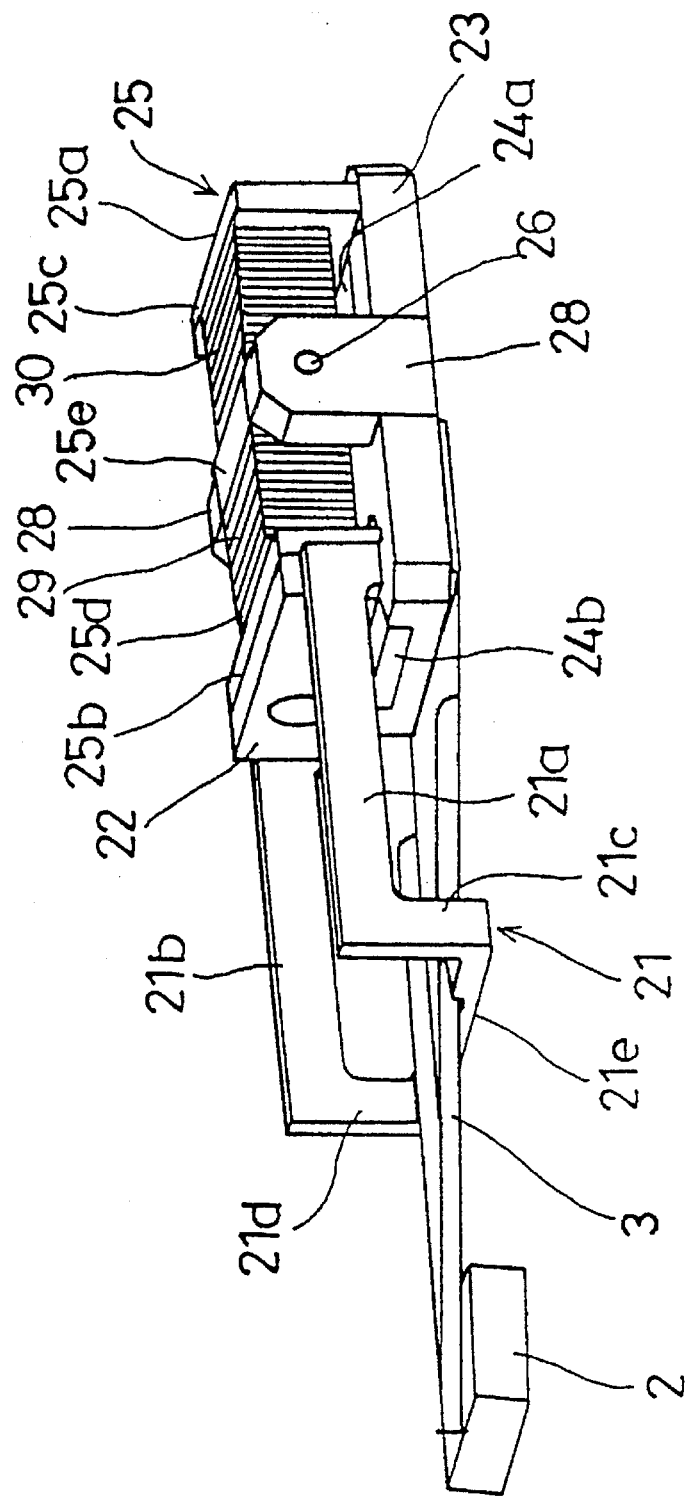
FIG. 5 is a perspective view of an embodiment of a magnetic head loading/unloading apparatus according to the present invention.

FIGS. 5 through 9 show an embodiment of a magnetic head loading/unloading apparatus according to the present invention.

The magnetic head loading/unloading apparatus according to the present invention comprises the head arm 3, a contacting arm 21, a yoke 23 made of a magnetic material, a pair of permanent magnets 24a and 24b, a bobbin (yoke) 25 made of a magnetic material, a shaft 26, a photointerrupter 27, a pair of bearing members 28, and coils 29 and 30. The head arm 3 is made of a leaf spring having an elastic property, and is provided with the magnetic head 2 on an end thereof. The contacting arm 21 contacts and presses a bottom surface of the head arm 3 so as to bend the head arm 3 and thus move the magnetic head 2 to an unload position. Each of the permanent magnets 24a and 24b forms a magnetic field in a direction indicated by an allow Y in FIG. 6. The shaft 26 passes through a center of the bobbin 25. The photointerrupter 27 detects a position of the bobbin 25. The hole 28a of the bearing members 28 supports opposite ends of the shaft 26, respectively. The coils 29 and 30 wound on the bobbin are arranged in positions facing the permanent magnets 24a and 24b.

Figure 6:
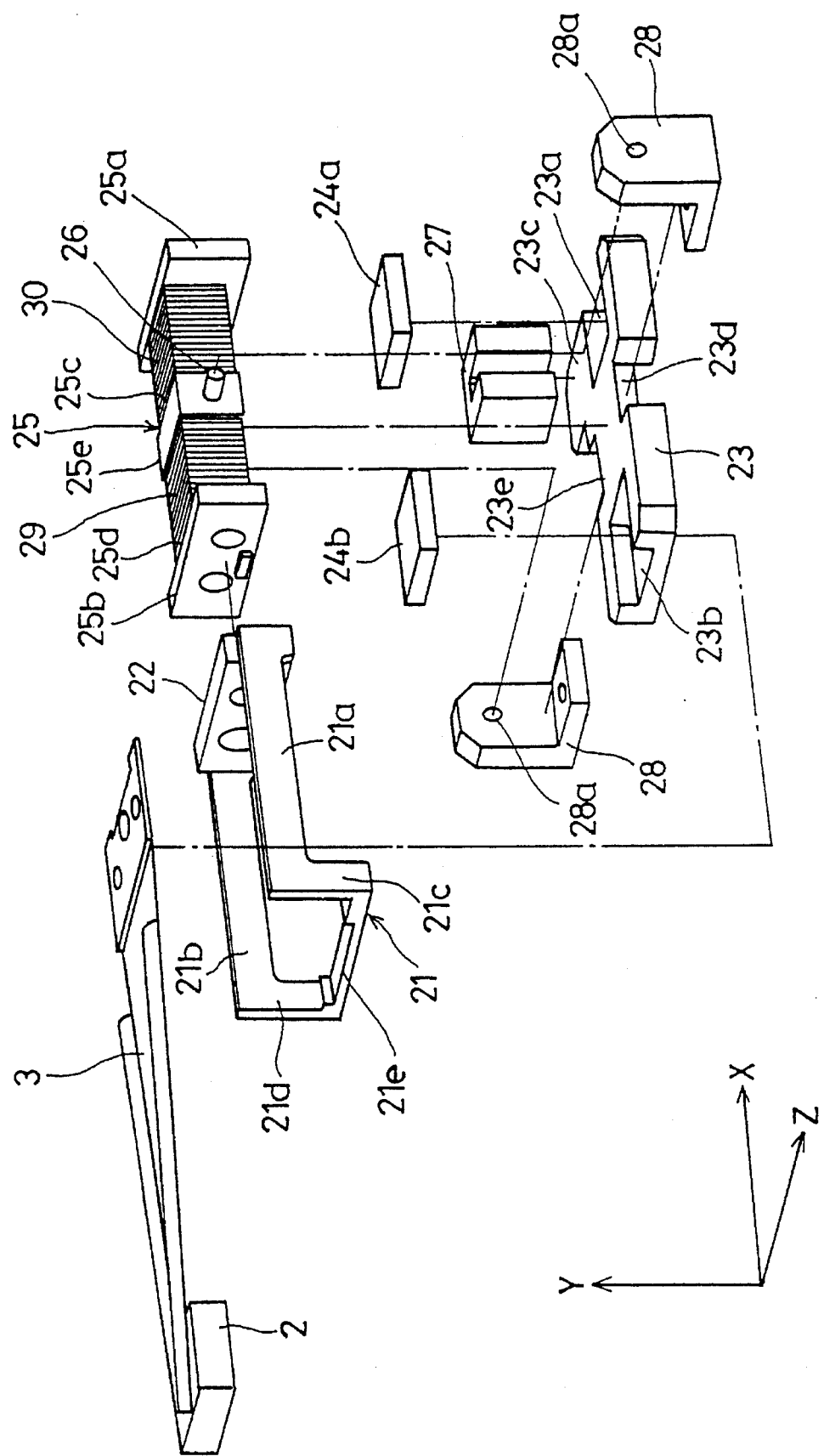
FIG. 6 is an exploded perspective view of the magnetic head loading/unloading apparatus shown in FIG. 5.
Figure 7:
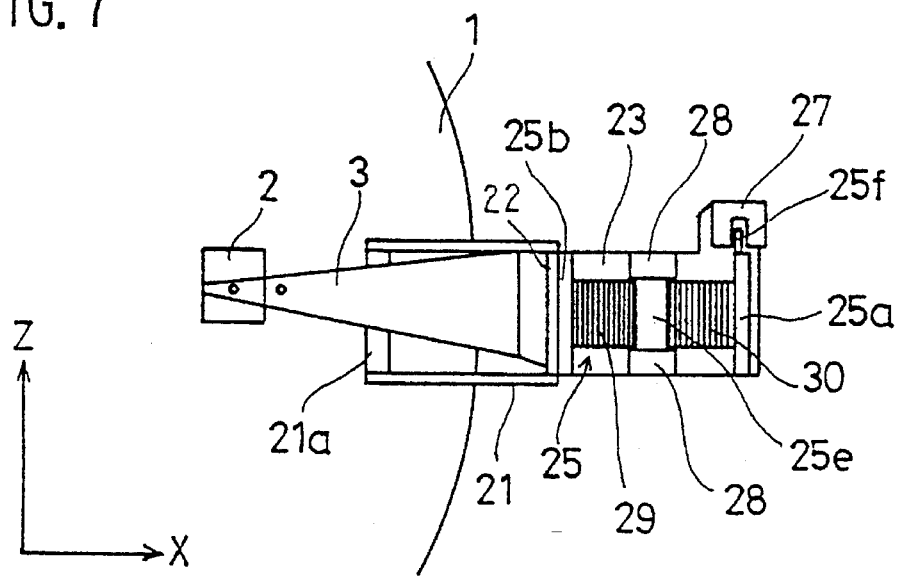
FIG. 7 is a side view of the magnetic head loading/unloading apparatus shown in FIG. 5.

The head arm 3 has a shape of, as shown in FIG. 7, a generally isosceles triangle, a bottom side of the triangle being fixed on a bottom surface of the head arm 3. The yoke 23 is fixed on the carriage 4 via a connecting member (not shown in the figures). The magnetic head 2 mounted on an end of the head arm 3 moves along a tracking direction (indicated by an arrow X in FIG. 6) as the carriage 4 is moved.

The yoke 23 comprises, as shown in FIG. 6, mounting recesses 23a and 23b in which the respective permanent magnets 24a and 24b are mounted, a supporting part 23c on which the photointerrupter 27 is supported, and fitting recesses 23d and 23e in which the bearing members 28 are fitted. The permanent magnets 24a and 24b are positioned in the respective mounting recesses 23a and 23b so that the same pole (either a S-pole or an N-pole) faces the respective coils 29 and 30.

The bobbin 25 has stoppers 25a and 25b which contact the yoke 23 on opposite ends thereof. The bobbin further has coil winding portions 25c and 25d and a center portion 25e formed thereon, the coil winding portions being provided with the respective coils 29 and 30, the shaft 26 being pressed into the center portion 25e.

Figure 8:
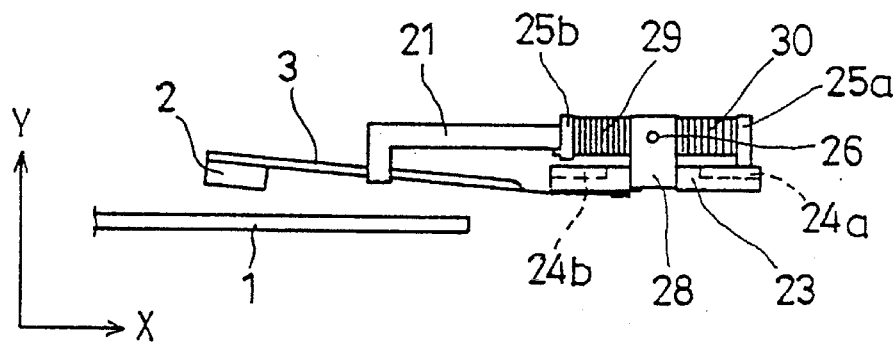
FIG. 8 is a side view of the magnetic head loading/unloading apparatus shown in FIG. 5 in an unloaded state.

It should be noted that a downward extending length of the stopper 25a is greater than that of the stopper 25b. Accordingly, when a lower end of the stopper 25a is in contact with the yoke 23, as shown in FIG. 8, a lower end of the stopper 25b is apart from the yoke 23. The bobbin 25 is thereby rotatable about the shaft 26 between a position where the stopper 25a is in contact with the yoke 23 and a position where the stopper 25b is in contact with the yoke 23.

The stopper 25a is provided with a protrusion 25f as shown in FIG. 7, the protrusion being positioned between a light emitting element and a light receiving element of the photointerrupter 27. The photointerrupter 27 is provided for determining whether the magnetic head 2 is positioned in the load position or the unload position. When the bobbin 25 is rotated counterclockwise (load position), and thus the protrusion is interposed between the light emitting element and the light receiving element of the photointerrupter 27, a detection signal is output from the photointerrupter 27.

The contacting arm 21 has a pair of arm portions 21a and 21b mounted on opposite side of a mounting plate 22 which is fixed on the stopper 25b of the bobbin 25. The arm portions 21a and 21b are formed with downwardly extending portions 21c and 21d, respectively. A contacting portion 21e is formed between lower ends of the extending portions 21c and 21d. Since the contacting arm 21 is connected to the bobbin 25 via the mounting plate 22, the contacting arm 21 is rotated up and down with a rotation of the bobbin 25. The arm portions 21a and 21b of the contacting arm 21 extend to a center of the head arm 3, and thus the contacting portion 21e is positioned under the center of the head arm 3. The contacting portion 21e contacts the bottom surface of the head arm 3 in accordance with a rotation of the bobbin 25 when the magnetic head 2 is moved to the unload position.

Figure 10:
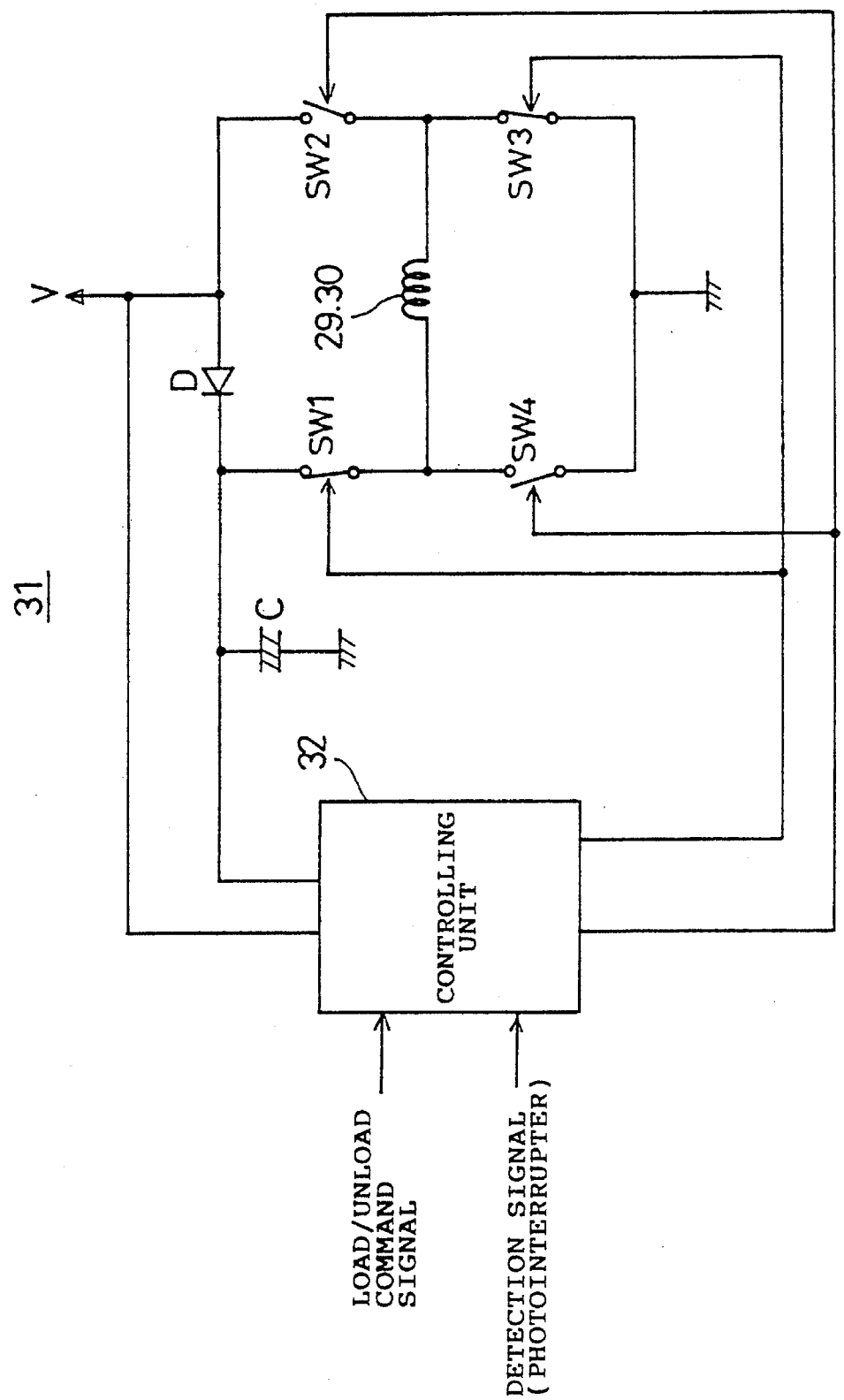
FIG. 10 is a circuit diagram of a driving circuit supplying a current to a coil.

FIG. 10 shows a driving circuit 31 which supplies a current to the coils 29 and 30.

As shown in FIG. 10, when the magnetic head 2 is moved from the unload position to the load position, a load command signal is input to a controlling unit 32. The controlling unit 32 determines whether the magnetic head loading/unloading apparatus is currently in a load state or an unload state according to the detection signal output from the photointerrupter 27. If it is determined that the magnetic head loading/unloading apparatus is in the unload state, switches SW2 and SW4 are closed, and at the same time switches SW1 and SW3 are opened.

Figure 12:
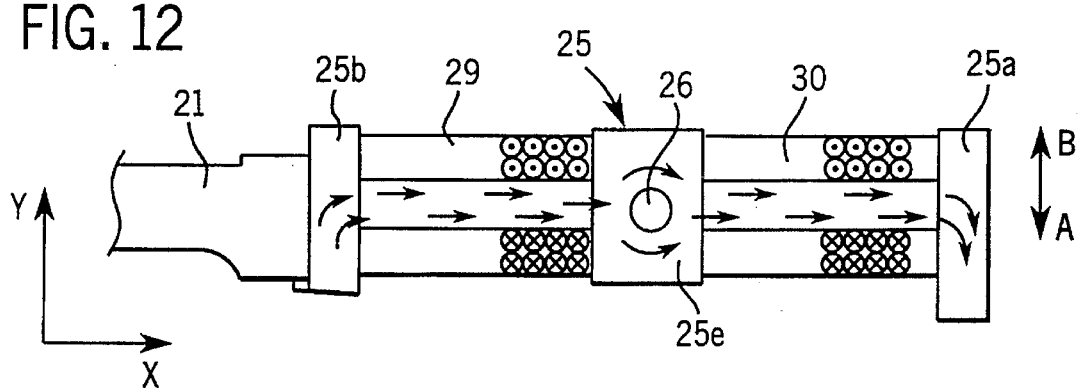
FIG. 12 is an illustration for explaining an operation of moving the magnetic head to a load position.

When the switches SW2 and SW4 are closed, a current flows in the coils 29 and 30 as shown in FIG. 12, and thus a magnetic field is generated in a direction indicated by arrows in the figure. Accordingly, the bobbin 25 is rotated counterclockwise about the shaft 26, and thus the magnetic head 2 is moved down to the load position.

When the stopper 25b of the bobbin 25 is moved to a position where the stopper 25b comes in contact with the permanent magnet 24b, the detection signal output from the photointerrupter 27 is at a low level which indicates the load state. The controlling unit 32 opens the switches SW2 and SW4 when the low level detection signal is input.

Figure 13:
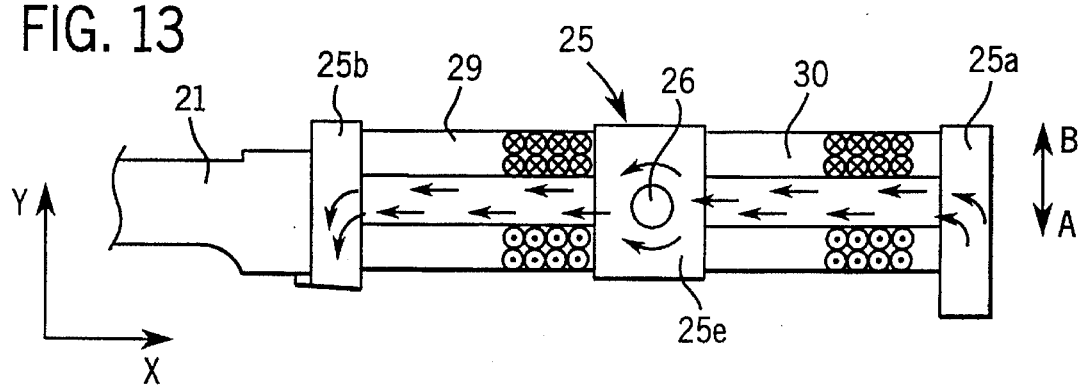
FIG. 13 is an illustration for explaining an operation of moving the magnetic head to an unload position.

On the other hand, when the magnetic head 2 is moved from the load position to the unload position, an unload command signal is input to the controlling unit 32. The controlling unit 32 then closes the switches SW1 and SW3, and at the same time opens the switches SW2 and SW4. When the switches SW1 and SW3 are closed, a current flows in the coils 29 and 30 as shown in FIG. 13, and thus a magnetic field is generated in a direction indicated by arrows in the figure. Accordingly, the bobbin 25 is rotated clockwise about the shaft 26, and thus the magnetic head 2 is moved up to the unload position.

A description will now be given of an operation in a case in which power is unintentionally cut off due to, for example, a power failure, while the magnetic head 2 is in a load position.

As shown in FIG. 10, a capacitor C is connected between the controlling unit 32 and the switch SW1. The capacitor C is always charged. When the power is cut off during the load state, the capacitor C starts to discharge, and thus a current is supplied to the controlling unit 32 and the switch SW1.

At this time the, controlling unit 32 closes the switches SW1 and SW3, and opens the switches SW2 and SW4.

Accordingly, a current flows in the coils 29 and 30 in a direction as indicated in FIG. 13, and thus the magnetic head 2 is moved, as previously mentioned, to the unload position.

Therefore, although the lifting force of the magnetic head 2 is decreased when the power is cut off during the load state, the magnetic head 2 does not collide with the magneto-optical disk 1 because the magnetic head 2 is lifted up to the unload position. Additionally, in a case in which the magneto-optical disk 1 is not provided with an electrically operated eject mechanism, the cartridge 6 accommodating the magneto-optical disk 1 can be ejected.

A description will now be given of an operation of the magnetic head loading/unloading apparatus.

Figure 11:
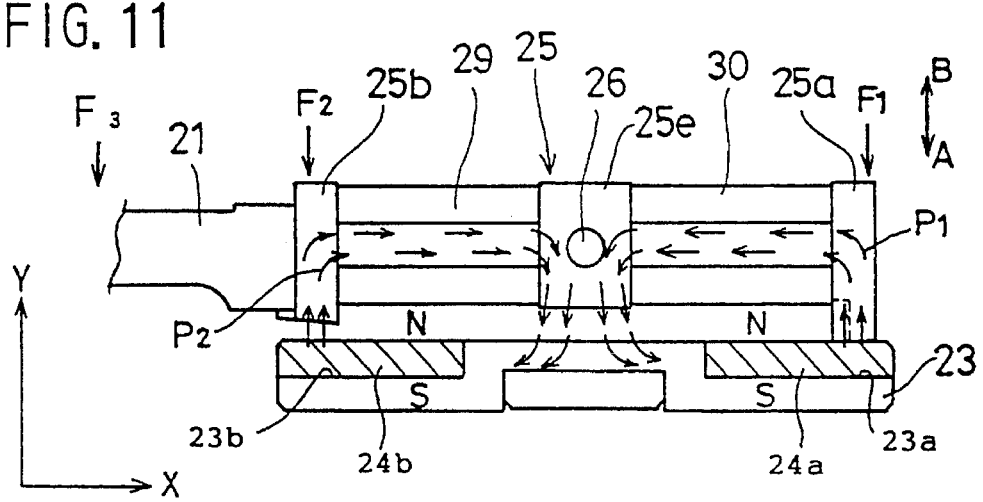
FIG. 11 is an illustration for explaining a magnetic field generated by permanent magnets provided in the magnetic head loading/unloading apparatus shown in FIG. 5.

As shown in FIGS. 8 and 11, when the magnetic head 2 is at the unload position, the lower end of the stopper 25a is in contact with the yoke 23 (permanent magnet 24a), and the lower end of the stopper 25b is apart from the yoke 23 (permanent magnet 24b). In this state, no current flows in the coils 29 and 30. Accordingly, magnetic fluxes generated by the permanent magnets 24a and 24b pass through, as shown in FIG. 11, magnetic circuits formed by the yoke 23 and the bobbin 25 which are made of a magnetic material, respectively.

In this state, an attracting force F1 generated by the permanent magnet 24a is exerted on the stopper 25a in a direction indicated by an arrow A. Additionally, an attracting force F2 generated by the permanent magnet 24b is exerted on the stopper 25b which is apart from the permanent magnet 24b. Since the stopper 25a is in contact with the permanent magnet 24a, the attracting force F1 exerted on the stopper 25a is greater than the attracting force F2 exerted on the stopper 25b (F1>F2).

Additionally, a force due to a weight W of the magnetic head 2, the head arm 3 and the contacting arm 21 is exerted in the direction indicated by the arrow A, and an elastic force F3 is exerted in the direction indicated by the arrow A due to the head arm 3 being bent by the contacting arm 21.

Accordingly, a counterclockwise moment T1 about the shaft 26 due to the forces F2+W+F3 and a clockwise moment T2 about the shaft 26 due to the force F1 are exerted on the bobbin 25. If the permanent magnets 24a and 24b selected have magnetic intensities which satisfy a condition in which the moment T1 is smaller than the moment T2 (T1<T2), the bobbin 25 can maintain the state in which the stopper 25a is in contact with the permanent magnet 24a.

When the bobbin 25 is rotated clockwise about the shaft 26, the contacting portion 21e of the contacting arm 21 contacts the bottom surface of the head arm 3, and thus the head arm 3 is elastically bent upward. As a result, the magnetic head 2 mounted on an end of the head arm 3 is maintained in the unload position. As mentioned above, since the head arm 3 is maintained in the unload state by means of the permanent magnet 24a, power consumption by the coils 29 and 30 is reduced, and thus an excessive increase in temperature inside the apparatus can be prevented. Additionally, since the above-mentioned construction is compact, time and labor for performing an assembling process is reduced, and thus high productivity can be realized.

When the magnetic head 2 is in the unload position, the protrusion 25f of the bobbin 25 is apart from the photointerrupter 27, and thus the detection signal output from the photointerrupter 27 is at a high level.

A description will now be given of an operation in which the magnetic head 2 is moved from the unload position to the load position.

As previously mentioned, the controlling unit 32 of the driving circuit 31 closes the switches SW2 and SW4, and opens the switches SW1 and SW3. At this time, a current flows in the coils 29 and 30 in a direction as indicated in FIG. 12. Due to this current, a magnetic flux is generated in the bobbin 25 in a direction indicated by arrows in FIG. 12. That is, a magnetic field in the stopper 25a of the bobbin 25 is formed in a direction opposite to the magnetic field formed by the permanent magnet 24a, and as a result, a magnetic flux density around the stopper 25a is reduced. On the contrary, a magnetic field having the same direction as that of the magnetic field formed by the permanent magnet 24b is formed in the stopper 25b, and as a result, a magnetic flux density around the stopper 25b is increased.

Accordingly, the attracting force F1 exerted on the stopper 25a is decreased, and the attracting force F2 exerted on the stopper 25b is increased, and thus the counterclockwise moment T1 becomes greater than the clockwise moment T2 (T1>T2). Therefore, the bobbin 25 is rotated counterclockwise about the shaft 26, the rotation of the bobbin being stopped at a position at which the stopper 25b is in contact with the permanent magnet 24b.

Figure 9:
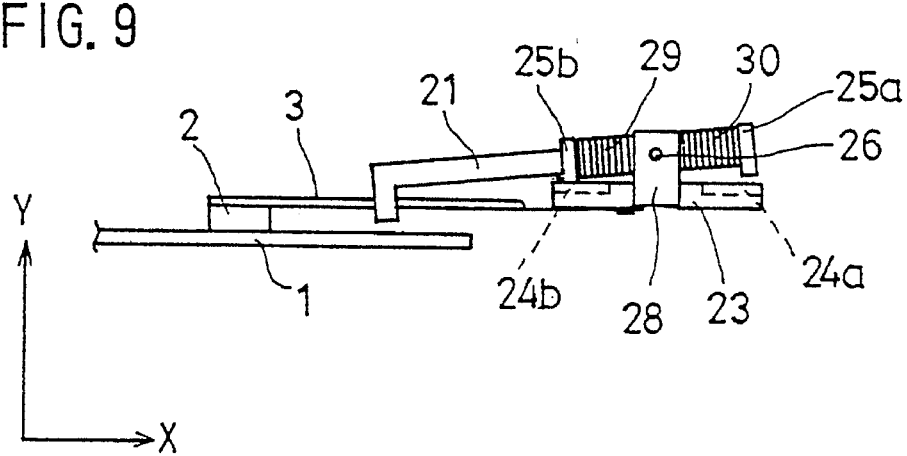
FIG. 9 is a side view of the magnetic head loading/unloading apparatus shown in FIG. 5 in a loaded state.

Additionally, the contacting portion 21e of the contacting arm 21 mounted on the bobbin 25 is moved down to be moved apart from the bottom surface of the head arm 3. Accordingly, the head arm 3 is released from the pressing force exerted by the contacting arm 21, and thus the magnetic head 2 is moved down to the load position as shown in FIG. 9.

At this time, the protrusion 25f provided on the bobbin 25 is interposed between the light emitting element and the light receiving element of the photointerrupter 27, and thus the detection signal of the photointerrupter 27 is at a low level based on the low level detection signal, it is detected that the magnetic head 2 is in the load position.

At this time, the magnetic head 2 is made to float due to an air flow generated around the magneto-optical disk 1 while the head arm 2 is being lifted against the elastic force of the head arm 3. The contacting arm 21 stops at a position between the head arm 3 and the magneto-optical disk 1 so that the contacting arm 21 is not in contact with either the head arm 3 or the magneto-optical disk 1.

In the state where the stopper 25b is in contact with the permanent magnet 24b, the attracting force F1 exerted on the stopper 25a due to the permanent magnet 24a becomes smaller than the attracting force F2 exerted on the stopper 25b due to the permanent magnet 24b (F1<F2), and thus the load state can be maintained even if a current supply to the coils 29 and 30 is cut off when the detection signal output from the photointerrupter 27 is at the low level.

In order to return the magnetic head 2 to the unload position after a recording/reproducing operation is ended, the controlling unit 32 closes the switches SW1 and SW3, and opens the switches SW2 and SW4. When the switches SW1 and SW3 are opened, a current flows in the coils 29 and 30 as indicated in FIG. 13.

Due to this current, a magnetic flux is generated in the bobbin 25 in a direction indicated by arrows in FIG. 13 (opposite to the direction of the magnetic flux in FIG. 12). That is, a magnetic field in the stopper 25b of the bobbin 25 is formed in a direction opposite to that of the magnetic field formed by the permanent magnet 24b, and as a result, a magnetic flux density around the stopper 25b is reduced. On the contrary, a magnetic field having the same direction as that of the magnetic field formed by he permanent magnet 24a is formed in the stopper 25a, and as a result, a magnetic flux density around the stopper 25a is increased.

Accordingly, the attracting force F2 exerted on the stopper 25b is decreased, and the attracting force F1 exerted on the stopper 25a is increased, and thus the counterclockwise moment T1 becomes smaller than the clockwise moment T2 (T1<T2). Therefore, the bobbin 25 is rotated clockwise about the shaft 26, the rotation of the bobbin 25 being stopped at a position at which the stopper 25a is in contact with the permanent magnet 24a.

Additionally, the contacting portion 21e of the contacting arm 21 mounted on the bobbin 25 is moved up to be made to contact the bottom surface of the head arm 3 and thus press the head arm 3. Accordingly, the head arm 3 is elastically bent upward by the pressing force exerted by the contacting arm 21, and thus the magnetic head 2 is moved up to the unload position as shown in FIG. 8.

At this time, the protrusion 25f provided on the bobbin 25 is apart from the photointerrupter 27, and thus the detection signal of the photointerrupter 27 is at the high level. Based on the high level detection signal, it is detected that the magnetic head 2 has been returned to the unload position.

It should be noted that in the above-mentioned embodiment, although a pair of magnetic circuits formed by the bobbin 25 and the yoke 23 are used, instead either one of the magnetic circuits may be used.

Additionally, although a pair of coils are provided on the bobbin 25, and a pair of permanent magnets 24a and 24b are provided on the yoke 23, the coils 29 and 30 may be provided on the yoke 23 and the permanent magnets 24a and 24b may be provided on the bobbin 25.

Further, although the photointerrupter 27 is used for detecting either the unload state or the load state, a detecting mechanism may instead be provided for detecting a contact of the stopper 25a and 25b of the bobbin 25 with the permanent magnets 24a and 24b, respectively, or detecting a contact of the contacting arm 21 with the head arm 3.

Although the above-mentioned embodiment is described with reference to a magneto-optical disk as an example, the present invention can be applied to a disk apparatus in which a flexible magnetic disk cartridge or an optical disk cartridge is loaded.

The present invention is not limited to the specifically disclosed embodiments, and variations and modifications may be made without departing from the scope of the present invention.

What is claimed is:

1. A magnetic head loading/unloading apparatus which moves a magnetic head between a load position and an unload position, a recording/reproducing operation being performed on a surface of a magnetic disk by the magnetic head in the load position, the unload position being apart from the load position in a direction perpendicular to the surface of the magnetic disk, said magnetic head loading/unloading apparatus comprising:

a head arm, made of an elastic material, having said magnetic head on one end thereof;

a first yoke made of a magnetic material, said head arm being fixed on an end of said first yoke;

a second yoke made of a magnetic material, said second yoke being arranged parallel to said first yoke;

a contacting member fixed on said second yoke, said contacting member pressing a bottom surface of said head arm so as to elastically deform said head arm so that said magnetic head is positioned in said unload position;

a supporting member rotatably supporting said second yoke on said first yoke, said second yoke being rotated between a first position and a second position, one end of said second yoke being in contact with said first yoke in said first position, the other end of said second yoke being in contact with said first yoke in said second position;

a permanent magnet provided on either one of said fist yoke and said second yoke so that a magnetic circuit is formed by said first yoke and said second yoke; and a coil provided on the other one of said first yoke and said second yoke, a current being supplied to said coil so that density of a magnetic flux generated by said permanent magnet is changed, wherein when said second yoke is moved to said first position, said head arm is elastically bent by a pressing force exerted by said contacting member so that said magnetic head is positioned in said unload position, and when said second yoke is moved to said second position, said contacting member is apart from said head arm so that said magnetic head is in said load position.

2. The magnetic head loading/unloading apparatus as claimed in claim 1, further comprising switching means for switching a direction of said current supplied to said coil so as to change a direction of a magnetic field formed by said permanent magnet so that a density of a magnetic flux passing through said magnetic circuit is varied.

3. The magnetic head loading/unloading apparatus as claimed in claim 1, wherein said second yoke is rotatably supported by said supporting member at a support portion positioned in a center of said second yoke, and said coil comprises a first coil and a second coil, said first coil and said second coil being positioned on opposite sides of said support portion on said second yoke.

4. The magnetic head loading/unloading apparatus as claimed in claim 3, wherein said permanent magnet comprises a first permanent magnet and a second permanent magnet, said first permanent magnet being provided on said first yoke at a position corresponding to said one end of said second yoke, said second permanent magnet being provided on said first yoke at a position corresponding to said the other end of said second yoke, said head arm extending from a side on which said other end of said second yoke is located, said contacting arm extending from a side on which said second permanent magnet is located, said one end of said second yoke being in contact with said first permanent magnet when said second yoke is at said first position, and said other end of said second yoke being in contact with said second permanent magnet when said second yoke is at said second position.

5. The magnetic head loading/unloading apparatus as claimed in claim 1, further comprising detecting means for detecting a position of said second yoke, a detection being made when said second yoke is positioned at either one of said first position or said second position.

6. The magnetic head loading/unloading apparatus as claimed in claim 5, wherein said detecting means comprises a photointerrupter.

7. The magnetic head loading/unloading apparatus as claimed in claim 1, further comprising a controlling circuit which supplies a current to said coil so that said magnetic head is moved from said load position to said unload position when power supplied to a driving circuit driving said magnetic head loading/unloading apparatus is unintentionally cut off.

8. The magnetic head loading/unloading apparatus as claimed in claim 7, wherein said controlling circuit comprises a capacitor connected to said coil.

* * * * *